United States Patent [19]
Maeda et al.

[11] Patent Number: 6,118,479
[45] Date of Patent: Sep. 12, 2000

[54] OPTICAL TRANSMISSION METHOD, ERROR RATE EVALUATION METHOD APPLIED IN OPTICAL TRANSMISSION AND APPARATUS FOR GENERATING A SIGNAL FOR ERROR RATE EVALUATION

[75] Inventors: Kazuki Maeda, Neyagawa; Kuniaki Utsumi, Sanda; Susumu Morikura, Yawata, all of Japan

[73] Assignee: Matsushita Electric Industrial Co., Ltd., Osaka-fu, Japan

[21] Appl. No.: 09/235,486

[22] Filed: Jan. 22, 1999

[30] Foreign Application Priority Data

Jan. 23, 1998 [JP] Japan ................... 10-011487
Nov. 25, 1998 [JP] Japan ................... 10-333697

[51] Int. Cl.[7] ............ H04N 17/00; H04B 17/00; H04K 1/10; H04L 23/02; H04J 14/02
[52] U.S. Cl. .......... 348/192; 348/192; 348/180; 348/181; 348/193; 348/194; 714/704; 714/707; 375/260; 375/261; 375/224; 375/225; 375/295; 375/298; 359/132; 359/110; 359/191; 359/192; 359/125; 359/158
[58] Field of Search ................. 348/180, 181, 348/192, 193, 194; 714/704, 707; 375/261, 260, 295, 298, 224, 225, 227, 216; 359/132, 191, 192, 158, 182, 189, 125, 167, 110

[56] References Cited

U.S. PATENT DOCUMENTS

| | | | |
|---|---|---|---|
| 4,278,850 | 7/1981 | Sato et al. | 179/175.31 |
| 4,941,208 | 7/1990 | Olshansky et al. | 455/618 |
| 4,989,200 | 1/1991 | Olshansky et al. | 370/3 |
| 5,134,509 | 7/1992 | Olshansky et al. | 359/132 |
| 5,208,666 | 5/1993 | Elkind et al. | 358/139 |
| 5,293,260 | 3/1994 | Kikawa et al. | 359/177 |
| 5,451,999 | 9/1995 | Wesolowski | 348/180 |
| 5,874,992 | 2/1999 | Caporizzo | 348/192 |
| 6,043,919 | 3/2000 | Yoshizawa | 359/177 |

OTHER PUBLICATIONS

"QAM Transmission Performance in AM/QAM Hybrid SCM Optical Transmission System" by Maeda et al., 1991 Television Society, pp. 473–474.

"Analysis of BER of 16 QAM signal in AM/16 QAM hybrid transmission system" by K. Maeda et al., Electron Letters, vol. 29.

"Broad–Band AM–VSB/64QAM Cable TV System over Hybrid Figer/Coax Network" by X. Lu et al., IEEE Photonics Technology Letters, vol. 7, No. 4, 1995.

(List continued on next page.)

*Primary Examiner*—John K. Peng
*Assistant Examiner*—Paulos Natnael
*Attorney, Agent, or Firm*—Wenderoth, Lind & Ponack, L.L.P.

[57] ABSTRACT

In FIG. 5, a plurality of signal sources $21_1$ to $21_N$ each generate a carrier with different frequencies. A pulse signal generating portion 23 generates a pulse signal with the same period and time width as those of a horizontal synchronizing signal in NTSC system color television broadcasting. Delay devices $32_1$ to $32_N$ delay timing of the pulse signal for a randomly predetermined delay amount. Level adjuster $52_1$ to $52_N$ generate a modulating signal by adjusting each pulse base of the delayed pulse signal for a level within a range between 12.5% and 74.375% with respect to a pulse top. Modulators $42_1$ to $42_N$ output a signal obtained by modulating the carrier with the modulating signal. A multiplex portion 24 multiplexes the modulated signals to output a resultant signal as a test signal. The error rate of a QAM signal is evaluated with the test signal. It is therefore possible to evaluate the error rate of the QAM signal in a signal state approximate at the maximum to a state of an actual AM video signal (that is, analogous distribution characteristics of the multiplex signal amplitude). In the error rate evaluation method according to an embodiment of the present invention, it is thus possible to accurately evaluate the error rate of the QAM signal under the strictest conditions, which may occur in the actual, AM video signal, thereby ensuring the reliability of the entire CATV system.

9 Claims, 10 Drawing Sheets

OTHER PUBLICATIONS

"The Effect of Analog Video Modulation on Laser Clipping Noise in Optical Video–Distribution Newtworks" by Stuart S. Wagner et al.

"Color Television", edited by Nihon Hoso Kyokai, P. 570.

"Introduction to Cable Television, basic to application" supervised by Takehiro Izumi, Corona Publishing Co., Ltd. P. 196.

OPTICAL TRANSMISSION METHOD, ERROR RATE EVALUATION METHOD APPLIED IN OPTICAL TRANSMISSION AND APPARATUS FOR GENERATING A SIGNAL FOR ERROR RATE EVALUATION

BACKGROUND OF THE INVENTION

1. Field of the Invention

The present invention is related to optical transmission methods, error rate evaluation methods and signal generating apparatuses, and more specifically to an error rate evaluation method of a quadrature amplitude modulation (QAM) signal (hereinafter referred to as QAM signal) when a television video signal obtained by vestigial-sideband amplitude modulation (hereinafter referred to as AM video signal) and a QAM signal are multiplexed and optically-transmitted, a signal generating apparatus for generating a test signal for use in the above evaluation method and a transmission method for optically transmitting the multiplex signal.

2. Description of the Background Art

Hereinafter referred to as a first document is "QAM Transmission Performance in AM/QAM Hybrid SCM Optical Transmission System" by Maeda et al., 1991 Television Society national convention preliminary manuscript collection, pp. 473–474.

Further, referred to as a second document is "Analysis of BER of 16QAM signal in AM/16 QAM hybrid optical transmission system" by K. Maeda et al., Electronics Letters, Vol. 29, PP. 640–642 (1993).

Further, referred to as a third document is "Broad-Band AM-VSB/64QAM Cable TV System over Hybrid Fiber/Coax Network" by X. Lu et al., IEEE Photonics Technology Letters, Vol. 7, No. 4, April 1995.

Still further, referred to as a fourth document is "The Effect of Analog Video Modulation on Laser Clipping Noise in Optical Video-Distribution Networks" by Stuart S. Wagner et al., IEEE Photonics Technology Letters, Vol. 8, No. 2, February 1996.

Conventionally, as a method for multiplexing and optically-transmitting a multiplex signal of AM video signals and a QAM signal in a video transmission system, a method described in the first document has been suggested. The method described in the first document is to multiplex an AM video signal with QAM signals intended for distribution of digital compression video signals and the like in a cable television (CATV) system.

The second document analyzes the transmission characteristics of the QAM signal in the optical transmission method and the like described in the first document. In the second document, described is a method for evaluating the error rate characteristic of the QAM signal by optically transmitting a test signal obtained by multiplexing a carrier approximate to the AM video signal and the QAM signal.

Specifically, reported in the second document are that the transmission quality of QAM signals is extraordinarily deteriorated by clipping distortion which occurs in a semiconductor laser due to AM video signals, and that clipping distortion of AM video signals is predominant over the transmission quality of QAM signal.

Conventional apparatuses for use in evaluating the error rate characteristic of QAM signals described in the second document include, for example, a TV multi-channel signal generator in Panasonic electronics measuring instrument catalog, 1994 edition, p. 219 (hereinafter referred to as a conventional multiplex signal generator). The conventional multiplex signal generator generates a carrier approximate to an AM video signal or generates a test signal obtained by modulating the carrier with a pulse signal, evaluating complex mutual modulation distortion, cross modulation interference and the like in an amplifier used in a transmission path of a CATV system and a television signal transmission apparatus such as an optical transmission apparatus.

Described briefly below is the above conventional multiplex signal generator referring to FIG. 9.

FIG. 9 is a block diagram showing an example of the structure of the conventional multiplex signal generator. In FIG. 9, the conventional multiplex signal generator includes a plurality of signal sources $61_1$ to $61_N$ (N is an integer not less than 2), a pulse signal generating portion 631, a multiplex portion 641, and a pulse modulation portion 621.

The plurality of signal sources $61_1$ to $61_N$ are so-called oscillators, each generating an independent carrier with a different frequency (the total number of generated carriers is N). The pulse signal generating portion 631 generates a pulse signal having a period of 15.75 kHz, which is a horizontal synchronizing period of a color television signal in the present NTSC system, and a pulse width of its horizontal synchronizing signal (=0.08* (horizontal synchronizing signal period) μsec). The multiplex portion 641 multiplexes the carriers outputted from the plurality of signal sources $61_1$ to $61_N$ and outputs a resultant multiplex signal. When cross modulation distortions are evaluated, the pulse modulation portion 621 receives the inputs of the above multiplex carrier and the above pulse signal, and then outputs a signal obtained by modulating the carrier with the pulse signal.

On the other hand, described in the third document is an optimal optical modulation index of the AM video signal in the optical transmission method of simultaneously transmitting the AM video signal and the QAM signal shown in the first document. More specifically, when the AM video signal of 60 channels and the 64QAM signal are optically transmitted simultaneously, the effect of clipping is negligible due to the optical modulation index of the AM video signal being set to not more than 3.7%. The third document reports that this allows high-quality optical transmission of 64QAM signals.

However, in recent years, new findings have been obtained against the view in the second document as to evaluation of QAM signal transmission quality in the method of multiplexing and optically transmitting an AM video signal and a QAM signal described in the second document. For example, the following characteristics are described in the fourth document.

In actual video communications systems, the AM video signal is modulated with a video signal, and the AM video signal thus has an amplitude smaller than that of the test signal generated in the above conventional multiplex signal generator, and clipping distortion in a semiconductor laser occurs less. However, the above conventional multiplex signal generator generates a plurality of carriers and multiplexes these carriers to output as a test signal. Therefore, the amplitude of the test signal has a wide range in normal distribution than the amplitude of the actual AM video signal, resulting in a higher probability of clipping distortion in the laser. Further, a pulse-modulated signal obtained by use of a pulse modulation function of the above conventional multiplex signal generator (the pulse modulation portion 621 and the pulse signal generator 631) is obtained by modulating a multiplex carrier with one pulse signal in the final output stage. Therefore, when only a pulse occurring period is considered, the result is also the same when only a carrier without pulse modulation is multiplexed, and error rate deterioration due to clipping is approximately the same (refer to FIG. 10).

Therefore, the value of the error rate deterioration of the QAM signal in the actual AM video signal is lower than that when evaluated by the test signal of the above conventional multiplex signal generator. The evaluating conditions are thus more stringent when the error rate of the QAM signal is evaluated with the test signal generated in the above conventional multiplex signal generator compared with when the error rate is evaluated in the actual video communications system, resulting in accurate error rate evaluation impossible. Furthermore, the fourth document does not mention the optimal distribution of each modulation index of the AM video signal and the 64 QAM signal when modulation signals are multiplexed as in this actual system.

SUMMARY OF THE INVENTION

Therefore, in order to cope with the view described in the above third document, an object of the present invention is to provide a method for evaluating an error rate of a QAM signal more accurately using a specific test signal without an actual AM video signal, and a signal generating apparatus for generating a test signal more approximate to the actual AM video signal with a simple structure. Another object of the present invention is to provide an optical transmission method capable of setting an effective optical modulation index for an actual optical transmission system in consideration of an amplitude modulation characteristic of the AM video signal.

The present invention has the following features to solve the objects above.

A first aspect of the present invention is directed to an error rate evaluation method for evaluating an error rate of a QAM signal when an AM video signal and the QAM video signal are multiplexed and optically transmitted, comprising the steps of:
   generating a test signal;
   optically transmitting the test signal through a transmission path; and
   receiving the test signal optically transmitted through the transmission path and evaluating the error rate of the QAM signal;
   in order to generate the test signal, the method generating;
   a plurality of carriers with different frequencies; and
   a plurality of pulse signals with the same period and time width as those of a horizontal synchronizing signal in NTSC color television system standards, each being delayed for a randomly predetermined delay amount, with a level of a pulse base with respect to a pulse top adjusted to a predetermined level within a level range which a video signal amplitude can take with respect to a peak level of the horizontal synchronizing signal in the standards; and
   the method using, as the test signal, a multiplex signal obtained by multiplexing a plurality of modulated signals obtained by modulating amplitudes of a plurality of carriers which can be substituted for the AM video signal among the plurality of carriers with the plurality of pulse signals.

As described above, in accordance with the first aspect, the modulating pulse signal is assumed to be the horizontal synchronizing signal of the actual AM video signal (video signal in NTSC color television systems), and further, the pulse base level of the pulse signal is assumed to be an amplitude level which the AM video signal of the system standards can take, and adjusted to be a desired value. Therefore, in the first aspect, it is possible to accurately evaluate the QAM signal error rate under the conditions similar to those when the actual AM video signal and the QAM signal are multiplexed.

According to a second aspect, in the first aspect, each of the plurality of pulse signals is adjusted so that the pulse base becomes at an average level of black level amplitudes with respect to the pulse top when the AM video signal represents black picture.

As described above, in accordance with the second aspect, the pulse signal generated in the first aspect is at the average level of the black level amplitudes with respect to the pulse top when the pulse base provides a maximum amplitude of the AM video signal. Therefore, in the second aspect, it is possible to evaluate the QAM signal error rate under the most stringent conditions for the multiplex signal of the actual AM video signals.

According to a third aspect, in the first aspect, each of the plurality of pulse signals is adjusted so that the pulse base becomes at an amplitude average level with respect to the pulse top when amplitudes of the AM video signal are equally distributed.

As described above, in accordance with the third aspect, the pulse signal generated in the first aspect is at the amplitude average level with respect to the pulse top when the amplitudes of the AM video signal are equally distributed. Therefore, in the third aspect, it is possible to evaluate the QAM signal error rate under general conditions for the multiplex signal of the actual AM video signals.

A fourth aspect is directed to an error rate evaluation method for evaluating an error rate of a QAM signal when an AM video signal and the QAM video signal are multiplexed and optically transmitted, comprising the steps of:
   generating a test signal;
   optically transmitting the test signal through a transmission path; and
   receiving the test signal optically transmitted through the transmission path and evaluating the error rate of the QAM signal;
   in order to generate the test signal, the method generating;
   a plurality of carriers with different frequencies; and
   the method using, as the test signal, a signal obtained by adjusting amplitudes of a plurality of carriers which can be substituted for the AM video signal among the plurality of carriers to a predetermined level within a level range which a video signal amplitude can take with respect to a peak level of a horizontal synchronizing signal in NTSC color television system standards.

As described above, in accordance with the fourth aspect, each of the amplitudes of the plurality of carriers is adjusted to an arbitrary level within a range which the video signal can take with respect to the amplitude to be evaluated, and then substituted for the AM video signal. Therefore, in the fourth aspect, it is possible to more easily evaluate the QAM signal error rate under the conditions similar to those when the actual AM video signal and the QAM signal are multiplexed, without pulse modulation of carriers as in the first aspect.

According to a fifth aspect, in the fourth aspect, each of the amplitudes of the carriers is adjusted to an average level of black level amplitudes with respect to the peak level when the AM video signal represents black picture.

As described above, in accordance with the fifth aspect, the amplitude of the carrier set in the fourth aspect is at the average level of the black level amplitudes when the AM video signal represents black picture which provides the maximum value. Therefore, in the fifth aspect, it is possible to more easily make conditions approximately equal to the most stringent conditions for the multiplex signal of the actual AM video signals, without pulse modulation of carriers as in the first aspect.

According to a sixth aspect, in the fourth aspect, each of the amplitudes of the carriers is adjusted to an amplitude average level with respect to the peak level when amplitudes of the AM video signal are equally distributed.

As described above, in accordance with the sixth aspect, the amplitude of the carrier set in the fourth aspect is at the average level when the amplitudes of the AM video signal are equally distributed. Therefore, in the sixth aspect, it is possible to more easily make conditions approximately equal to general conditions for the amplitude of the multiplex signal of the actual AM video signals, without pulse modulation of carriers as in the first aspect.

A seventh aspect is directed to a signal generating apparatus for generating a test signal used for evaluating an error rate of a QAM signal when an AM video signal and the QAM signal are multiplexed and optically transmitted, comprising:

a plurality of carrier generating means for generating carriers with different frequencies;

pulse signal generating means for generating a pulse signal with a period and time width equal to those of a horizontal synchronizing signal in NTSC color television system standards;

a plurality of delay means for delaying the pulse signal outputted from the pulse signal generating means for a randomly predetermined delay amount;

a plurality of level adjusting means for adjusting a level of a pulse base with respect to a pulse top of a delayed pulse signal outputted from the delay means to a predetermined level within a level range which a video signal amplitude can take with respect to a peak level of the horizontal synchronizing signal in the standards;

a plurality of modulation means for modulating a plurality of carriers which can be substituted for the AM video signal among the carriers generated by the carrier generating means with an adjusted pulse signal outputted from the level adjusting means; and multiplex means for multiplexing a plurality of modulated signals outputted from the plurality of modulation means or for multiplexing a plurality of pulse modulating signals outputted from the plurality of modulation means and carriers other than the plurality of carriers which can be substituted for the AM video signal, and then outputting a resultant signal as the test signal.

As described above, in accordance with the seventh aspect, a test signal is generated by multiplexing the actual video signal and the QAM signal as simulation. Therefore, in the seventh aspect, it is possible to make conditions similar to those when the actual AM video signals are multiplexed without many AM video signals, allowing accurate QAM signal error rate evaluation.

According to an eighth aspect, in the seventh aspect, the plurality of level adjusting means can at least selectively switch the pulse base with respect to the pulse top between a pulse base adjusted to an average level of black level amplitudes when the AM video signal represents black picture and a pulse base adjusted to an amplitude average level when amplitudes of the AM video signal are equally distributed.

As described above, in accordance with the eighth aspect, the plurality of level adjusting means in the seventh aspect can at least selectively switch between the pulse base level corresponding to the average level of black level amplitudes when the AM video signal represents black picture which provides the maximum amplitude and the pulse base level corresponding to the amplitude average level when the amplitudes of the AM video signal are equally distributed. Therefore, in the eighth aspect, it is possible to further improve operability of setting conditions in QAM signal error rate evaluation.

A ninth aspect is directed to a method for simultaneously optically-transmitting analog video information and digital video information, comprising the steps of:

amplitude-modulating carriers with different frequencies with the analog video information and generating an AM video signal by a plurality of AM video signal sources;

64-value-quadrature-amplitude-modulating the carriers with the digital video information and generating a 64QAM signal by one or more 64QAM signal sources;

frequency multiplexing the AM video signal generated by each of the AM video signal sources and the 64QAM signal generated by each of the 64QAM signal sources by frequency multiplex means; and subjecting the AM video signal and the 64QAM signal frequency-multiplexed by the frequency multiplex means to electrical-optical conversion to obtain and output an optical intensity modulation signal to an optical transmission path; wherein the outputted optical modulating signal is generated so as to satisfy:

a first condition that an optical modulation index which makes the AM video signal not less than a required CNR is assigned to the carriers of the analog video signal;

a second condition that an optical modulation index which makes distortion in a transmission band of the AM video signal not more than a required value is assigned to a carrier of the AM video signal and the 64 QAM signal; and a third condition that an optical modulation index of the analog video signal is approximately 70% of the optical modulation index of the carrier included in the AM video signal, and that an optical modulation index by which each of the 64 QAM signal achieves required quality is assigned to a carrier of the 64QAM signal.

As described above, in accordance with the ninth aspect, particularly, as a range for achieving transmission quality of the 64QAM signal in optical transmission, the optical modulation index of the AM video signal is taken as approximately 70% with respect to the optical modulation index of the carrier of the AM video signal, and the optical modulation index which achieves required quality of the 64 QAM signal with respect to the optical modulation index of the AM video signal is taken as the optical modulation index of the carrier of the 64 QAM signal. Thus, in the ninth aspect, it is possible to neglect the effect of clipping even with the optical modulation index larger than 3.7% which is thought to be optimal as the optical modulation index of the AM video signal in the above second document. Therefore, in the ninth aspect, it is possible to widen the setting range of the optical modulation index compared with that conventionally set in consideration of the optical modulation index of the carriers, and accordingly widen the setting range of the optical modulation index of the AM video signal, allowing more transmission margins with respect to the AM video signal.

These and other objects, features, aspects and advantages of the present invention will become more apparent from the following detailed description of the present invention when taken in conjunction with the accompanying drawings.

DESCRIPTION OF THE PREFERRED EMBODIMENT

Described below is a system to which an optical transmission method according to an embodiment of the present invention is applied referring to FIG. 1 to FIG. 4. Also described is an error rate evaluation method applied to the system to which the optical transmission method according to the embodiment of the present invention is applied, together with a signal generating apparatus for generating a test signal used for the error rate evaluation method, referring to FIG. 5 to FIG. 8.

Figure 1:
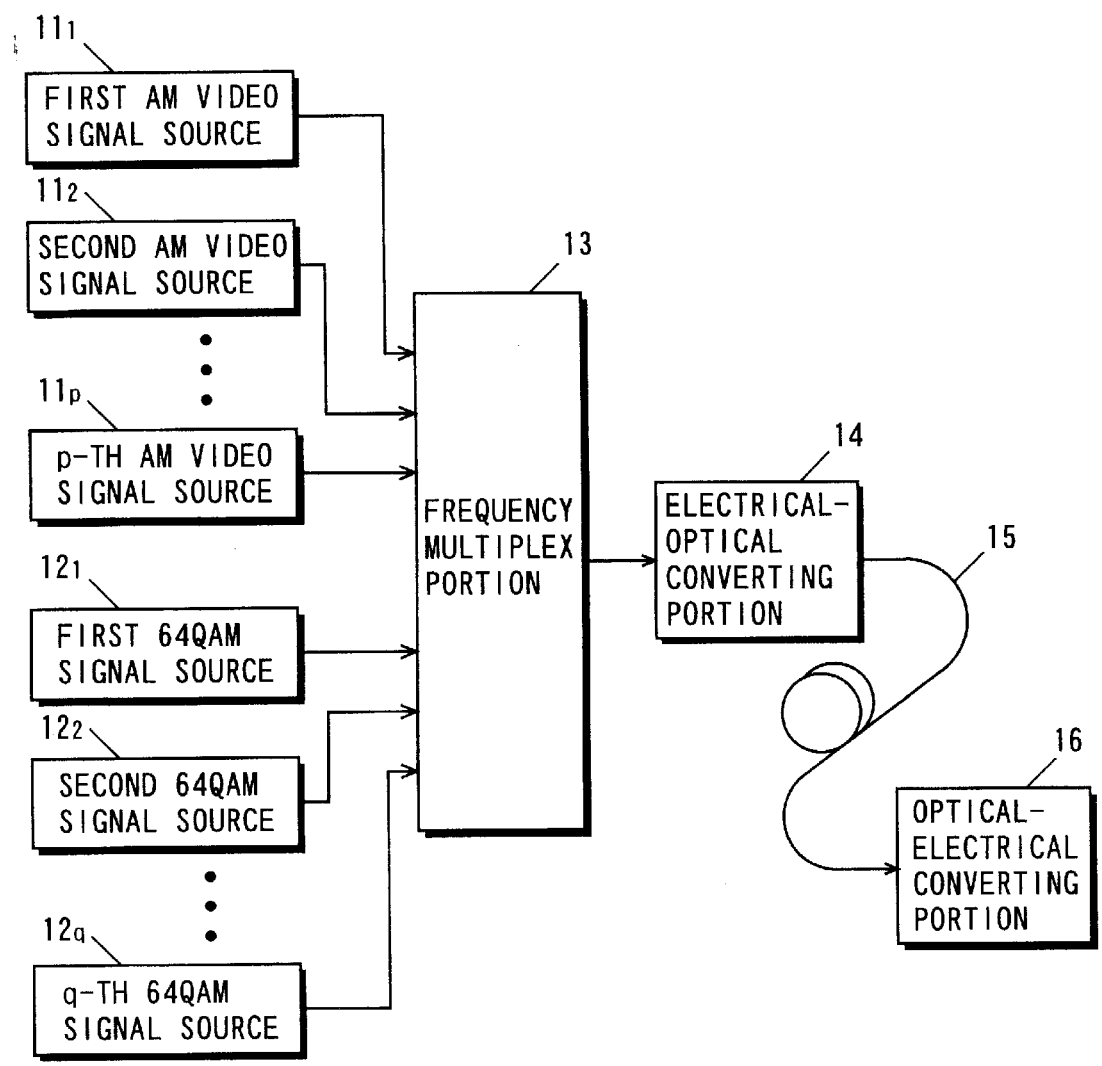
FIG. 1 is a block diagram showing the structure of an optical transmission system to which an optical transmission method according to an embodiment of the present invention is applied.

Described first is the optical transmission system to which the optical transmission method according to the embodiment of the present invention is applied. FIG. 1 is a block diagram showing the structure of the optical transmission system to which the optical transmission method according to the embodiment of the present invention is applied. The optical transmission system includes, as shown in FIG. 1, first to p-th AM video signal sources $11_1$ to $11_p$, first to q-th 64QAM signal sources $12_1$ to $12_q$, a frequency multiplex portion 13, an electrical-optical converting portion 14, an optical fiber 15, and an optical-electrical converting portion 16, where p is an integer not less than 2 and q is a natural number.

Each of the AM video signal sources $11_1$ to $11_p$ subjects carriers with different frequencies to amplitude modulation with analog video information to generate an AM video signal. Each of the 64QAM signal sources $12_1$ to $12_q$ subjects carriers with different frequencies to 64 value quadrature amplitude modulation with digital information to generate a 64QAM signal. The frequency multiplex portion 13 multiplexes each AM video signal generated from each of the signal sources $11_1$ to $11_p$ and each 64QAM signal generated from each of the signal sources $12_1$ to $12_q$. The electrical-optical converting portion 14 performs electrical-optical conversion to convert each AM video signal and each 64QAM signal multiplexed by the frequency multiplex portion 13 to an optical intensity modulation signal and outputs it to the optical fiber 15. The optical intensity modulation signal is transmitted through the optical fiber 15 and then converted to an original electrical signal, that is, each frequency-multiplexed AM video signal and each 64QAM signal, in the optical-electrical converting portion 16.

Described next are conditions of a setting range of an optical modulation index of each AM video signal and each 64QAM signal included in the optical intensity modulation signal. A first condition is that a minimum optical modulation index of the AM video signal achieves a required CNR of the AM video signal. Since the optical modulation index is different according to transmission parameters of the optical transmission system shown in FIG. 1, the optical modulation index has a value unique to the system. If the transmission parameters are given, the optical modulation index can be calculated by the following equation (1):

$$CNR_{AM} = 10\log\left(\frac{(m\eta' P_r)^2}{2\{2eP_r + I_n^2 + (\eta' P_r)^2 RIN\}B}\right) \quad (1)$$

A variable m in the above equation (1) is the optical modulation index of each AM video signal. Other variants are transmission parameters as conditions. RIN is relative noise intensity of the optical fiber 15 as the transmission path. η' is conversion efficiency of an optical-electrical converting device included in the optical-electrical converting portion 16. $P_r$ is receive power. $I_n$ is an input conversion noise current intensity of the optical-electrical converting portion 16, and B is a noise bandwidth. $CNR_{AM}$ is required transmission quality of each AM video signal. e is electric charge. For example, when each transmission parameter is assumed as follows: RIN=−152 dB/Hz, η'=0.8 A/W, $P_r$=−1.0 dBm, $I_n$=10 pA/√Hz, B=4.2 MHz, and $CNR_{AM}$=51 dB, the optical modulation index m of each AM video signal is not less than 3.6% according to the above equation (1).

Figure 2:
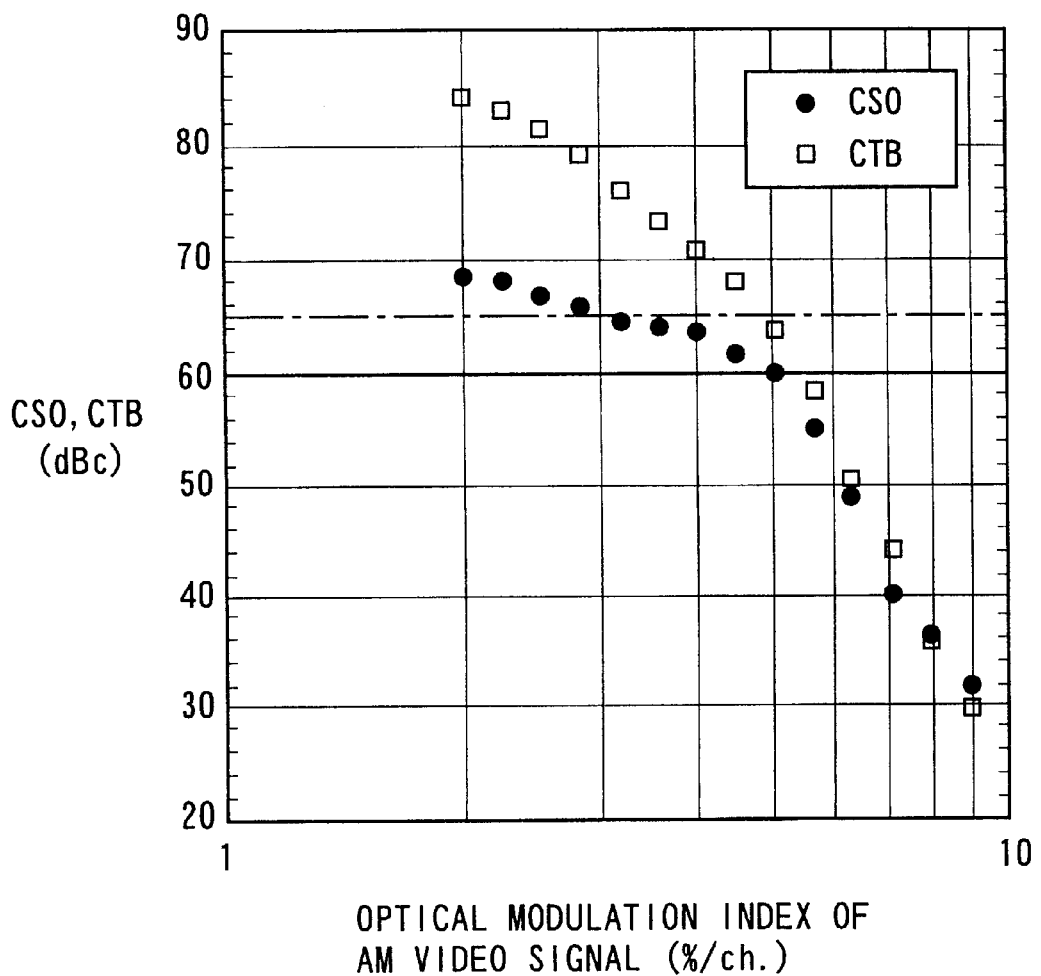
FIG. 2 is a diagram showing an example of characteristics of a laser diode applicable to an electrical-optical converting portion 14 shown in FIG. 1.

On the other hand, a maximum optical modulation index of each AM video signal and each 64QAM signal is restricted by distortion, which occurs in the transmission band of the AM video signal. This distortion depends on laser diode characteristics included in the electrical-optical converting portion 14 and differs according to each laser diode. For example, FIG. 2 shows characteristics of a laser diode manufactured by the Applicant and the results of optical transmission of carriers of an AM video signal with 60 channels using the laser diode. In FIG. 2, the horizontal axis represents the optical modulation index of the AM video signal, while the vertical axis represents composite second order distortion (CSO) and composite triple beat (CTB) For the required distortion in each channel of the AM video signal, CSO is assumed to not more than −60 dBc (shown by a solid line in the drawing), while CTB is assumed to not more than −65 dBc (shown by a dotted-and-dashed line in the drawing). Further, in FIG. 2, A CSO characteristic curve is represented by black dots (● marks), while a CTB characteristic curve is represented by hollow squares (□ marks). According to the above laser diode shown in the drawing, the optical modulation index of the AM video signal can be set up to 4.8%. This value is lager than the optimal optical modulation index shown in the above third document for more than 1%. When the optical modulation index of the AM video signal is 4.8%, the total effective optical modulation index $\mu$, which is an index for determining distortion in AM video signal optical transmission, is 0.26. Assuming that the total effective optical modulation index $\mu$ ensures distortion which occurs in the transmission band of the AM video signal even when an AM video signal and a 64QAM signal are simultaneously transmitted, the optical modulation index range of the AM video signal and the 64QAM signal can be given by the following equation (2):

$$\mu = \sqrt{\frac{m^2 N_A + h^2 N_Q}{2}} < 0.26 \tag{2}$$

m is the optical modulation index of the carrier approximate to the AM video signal and $N_A$ is the number of carriers, while h is the optical modulation index of the carrier approximate to the 64QAM signal and $N_Q$ is the number of the carriers.

As described above, for the above optical intensity modulation signal, it is required to satisfy a second condition that the optical modulation index which makes the distortion occurred in the transmission band of the AM video signal not more than a required amount (that is, the total effective optical modulation index $\mu$ in the above equation (2)) is assigned to the carrier of the AM video signal and 64QAM signal.

Further, a third condition relates to a condition for restricting the optical modulation index of each 64QAM signal, and more specifically, to a condition that the optical modulation index of each 64QAM signal, which can achieve a required error rate with respect to the optical modulation index of each AM video signal, is assigned to the carrier of the 64QAM signal. When the required error rate of each 64QAM signal before error correction is assumed not more than $10^{-9}$, the optical modulation index of each 64QAM signal can be obtained with the following analytical method.

First, the error rate $P_b$ of the QAM signal in the optical transmission system shown in FIG. 1 is given by the following equation (3):

$$P_b = \frac{2}{\log_2[\sqrt{M}]} \left(1 - \frac{1}{\sqrt{M}}\right) e^{-A} \sum_{j=0}^{\infty} \frac{A^j}{j!} \mathrm{erfc}\left[\sqrt{\frac{3DUR}{2(M-1)}} \frac{1}{\sigma_j}\right] \tag{3}$$

A is an impulse index. DUR is the ratio between the average power of the QAM signal and the sum of the average power of Gauss noise and impulse noise in the QAM channel. $\sigma_j^2$ in the above equation (3) is given by the following equation (4):

$$\sigma_j^2 = \frac{j/A + \Gamma'}{1 + \Gamma'} \tag{4}$$

Further, $\Gamma'$ in the above equation (4) is given in the following equation (5):

$$\Gamma' = \frac{CNLD}{CNR_{QAM}} \tag{5}$$

$CNR_{QAM}$ is the ratio between power of the carrier of the QAM signal and thermal noise power in the channel. CNLD is the ratio between power of the carrier of the QAM signal and the average power of the impulse noise in the channel, which is given by the following equation (6):

$$CNLD = \sqrt{2\pi}\, \mu^{-3}(1 + 6\mu^2)e^{1/\mu^2} \tag{6}$$

The impulse index A is defined by the product of the cross density of a frequency multiplex signal x[t] and a threshold of the laser diode and the continuous time of impulse noise. The cross density $\upsilon$ of x[t] and the laser threshold is given by the following equation (7):

$$v = \frac{1}{2\pi}\sqrt{\frac{-R''(0)}{R(0)}} \exp\left[\frac{-1}{2R(0)}\right] \tag{7}$$

R(0) is autocorrelation of the frequency multiplex signal where $\tau=0$.

When the AM video signal and QAM signal are simultaneously optically-transmitted, the frequency multiplex signal x[t] is represented as follows:

$$x[t] = \sum_{i=1}^{N_A} m_i[t]\cos[\omega_i t + \theta_i + \Theta_i] + \sum_{k=1}^{N_Q} h_k[t]\cos[\psi_k t + \phi_k + \Phi_k] \tag{8}$$

$m_i[t]$ is the optical modulation index of the AM video signal, while $h_k[t]$ is the optical modulation index of the QAM signal. $N_A$ is the number of AM video signals, while $N_Q$ is the number of QAM signals. $\omega_i$ and $\phi^k$ are angular rates that the carrier of the AM video signal and the carrier of the QAM signal have, respectively, and $\theta_i$ and $\phi_k$ are initial phases of the carrier of the AM video signal and the carrier of the QAM signal, respectively, which are random each other. $\Theta_i$ and $\Phi_k$ are phase variations of the carrier of the AM video signal and the carrier of the QAM signal, respectively, and assumed to be random variables whose average value is 0 and which are distributed over $-\pi$ to $\pi$.

The autocorrelation $R_{xx}[\tau]$ of x[t] is represented by the following equation (9):

$$R_{xx}[\tau] = \frac{1}{2}\sum_{i=1}^{N_A} R_{m_i m_i}[\tau]\cos[\omega_i \tau] + \frac{1}{2}\sum_{k=1}^{N_Q} R_{h_k h_k}[\tau]\cos[\psi_k \tau] \tag{9}$$

Therefore, where τ=0, the following equation (10) holds:

$$R[0] = \frac{1}{2}\sum_{i=1}^{N_A} R_{m_i m_i}[0] + \frac{1}{2}\sum_{k=1}^{N_Q} R_{h_k h_k}[0] = \frac{1}{2}\sum_{i=1}^{N_A} \overline{m}_i^2 + \frac{1}{2}\sum_{k=1}^{N_Q} \overline{h}_k^2 \quad (10)$$

/$m_i^2$ and /$h_k^2$ are square-root averages of the optical modulation indexes of each AM video signal and each QAM signal. Although a bar (-) is located just above m in the above equation (10), it is impossible to represent as such in this description, and therefore /$m_i^2$ is used here instead. /$h_k^2$ is used due to the same reason.

On the other hand, x'[t] exists and is given by the following equation (11):

$$x'[t] = \sum_{i=1}^{N_A} m_i'[t]\cos[\omega_i t + \theta_i + \Theta_i] - \omega_i m_i[t]\sin[\omega_i t + \theta_i + \Theta_i] + \quad (11)$$
$$\sum_{k=1}^{N_Q} h_k'[t]\cos[\psi_k t + \phi_k + \Phi_k] - \omega_k h_k[t]\sin[\psi_k t + \phi_k + \Phi_k]$$

The autocorrelation $R_{x'x'}[\tau]$ of x'[t] is given by the following equation (12):

$$R_{x'x'}|\tau| = \frac{1}{2}\sum_{i=1}^{N_A} R_{m_i' m_i'}[\tau]\cos[\omega_i \tau] + \omega_i^2 R_{m_i m_i}[\tau]\cos[\omega_i \tau] + \quad (12)$$
$$2\omega_i R_{m_i' m_i}[\tau]\sin[\omega_i \tau] +$$
$$\frac{1}{2}\sum_{k=1}^{N_Q} R_{h_k' h_k'}[\tau]\cos[\psi_k \tau] + \psi_k^2 R_{h_k h_k}[\tau]\cos[\psi_k \tau] +$$
$$2\psi_k R_{h_k' h_k}[\tau]\sin[\psi_k \tau]$$

In the above equation (12), where τ=0, the following equation (13) holds:

$$R_{x'x'}[0] = \frac{1}{2}\sum_{i=1}^{N_A} R_{m_i' m_i'}[0] + \omega_i^2 R_{m_i m_i}[0] + \quad (13)$$
$$\frac{1}{2}\sum_{k=1}^{N_Q} R_{h_k' h_k'}[0] + \psi_k^2 R_{h_k h_k}[0]$$
$$= \frac{1}{2}\sum_{i=1}^{N_A} \overline{m}_i'^2 + \omega_i^2 \overline{m}_i^2 + \frac{1}{2}\sum_{k=1}^{N_Q} \overline{h}_k'^2 + \omega_k^2 \overline{h}_k^2$$

/$m_i'^2$ and /$h_k'^2$ are square-root averages of time differential values of the optical modulation indexes of each AM video signal and each QAM signal. In the above equation (13), /$m_i'^2$ and /$h_k'^2$ are used due to the same reason in the above equation (10).

Further, the above equation (13) becomes as in the following equation (14):

$$R''|0| = -R_{x'x'}|0| = -\frac{1}{2}\sum_{i=1}^{N_A} \omega_i^2 \overline{m}_i^2 - \frac{1}{2}\sum_{k=1}^{N_Q} \psi_k^2 \overline{h}_k^2 \quad (14)$$

With the above equations (7), (10) and (14), $\omega_i = 2\pi f_i$, $\phi_k = 2\pi f_k$, and continuous time of the impulse in a class A model (equal to the symbol time (Ts) of the QAM signal), the impulse index A can be obtained by the following equation (15):

$$A = vT_s = \sqrt{\frac{\sum_{i=1}^{N_A} f_i^2 \overline{m}_i^2 + \sum_{k=1}^{N_Q} f_k^2 \overline{h}_k^2}{\sum_{i=1}^{N_A} \overline{m}_i^2 + \sum_{k=1}^{N_Q} \overline{h}_k^2}} \, T_s \exp\left[\frac{-1}{\sum_{i=1}^{N_A} \overline{m}_i^2 + \sum_{k=1}^{N_Q} \overline{h}_k^2}\right] \quad (15)$$

$f_i$ and $f_k$ are a frequency of the carrier of the AM video signal and a frequency of the carrier of the QAM signal, respectively.

The impulse index A represented by the above equation (15) can be represented as in the following equation (16) where all amplitude values of the carriers that each AM video signal and each QAM signal have are equal:

$$A = \sqrt{\frac{m^2 \sum_{i=1}^{N_A} f_i^2 + h^2 \sum_{k=1}^{N_Q} f_k^2}{m^2 N_A + h^2 N_Q}} \, T_s \exp\left[\frac{-1}{m^2 N_A + h^2 N_Q}\right] \quad (16)$$

In the above equation (16), m=/$m_i$ and h=/$h_k$.

On the other hand, under the conditions that the AM video signal and the QAM signal have the equal amplitude characteristic and that the synchronization between channels of the AM video signal to be transmitted are not established, assume that timing of horizontal synchronizing pulse of these channels are random, the impulse index A of the multiplex signal obtained by multiplexing a plurality of modulating signals is given by the following equation (17):

$$A = \quad (17)$$
$$\sqrt{\frac{(PF_A m)^2 \sum_{i=1}^{N_A} f_i^2 + (PF_Q h)^2 \sum_{k=1}^{N_Q} f_k^2}{(PF_A m)^2 N_A + (PF_Q h)^2 N_Q}} \, T_s \exp\left[\frac{-1}{(PF_A m)^2 N_A + (PF_Q h)^2 N_Q}\right]$$

Figure 3:
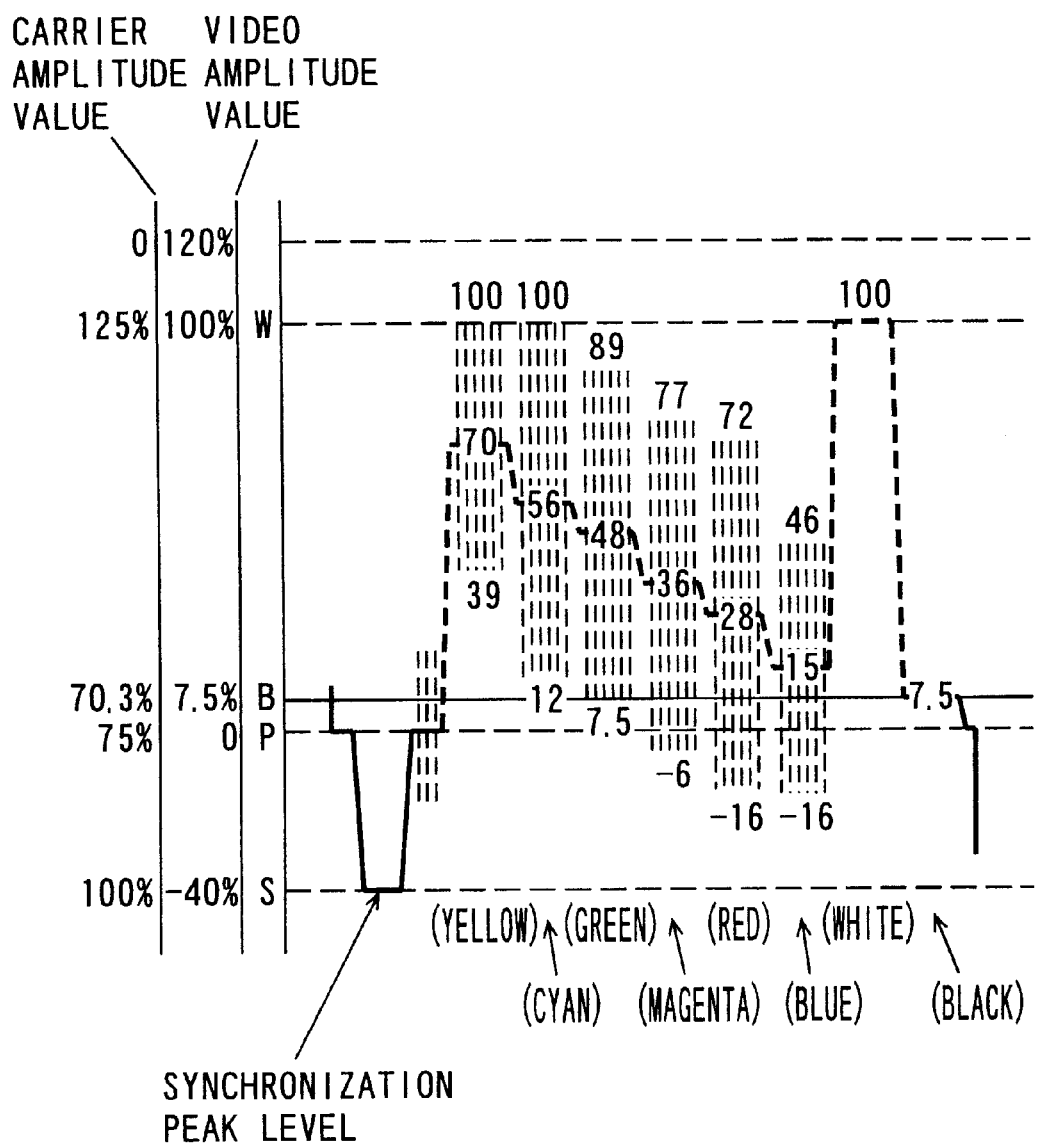
FIG. 3 is a diagram showing characteristics of an AM video signal of the NTSC standards.

Analyzed next is the average optical modulation indexes of the AM video signal and the QAM signal. In the QAM signal, the average amplitude varies according to the number of phases, and particularly in the 64QAM signal, the difference between the average amplitude and the amplitude value of the carrier (PFQ) is 0.66 (−3.67 dB). On the other hand, in the AM video signal, the characteristics of a video signal compliant with the NTSC standards as shown in FIG. 3 is considered. FIG. 3 is shown in a document "Color Television", edited by Nihon Hoso Kyokai, p. 570.

The AM video signal is subjected to negative modulation, and the average power at this time is smaller than the amplitude value of the carrier without modulation. The average amplitude value of the AM video signals becomes a maximum with black picture, and the difference from the value at a synchronization peak (PFA) is approximately 0.71. Therefore, when all AM video signals among the frequency multiplex signals (output signals from the frequency multiplex portion 13) are with black picture, the amplitude value of each AM video signal becomes a maximum, which most likely causes unwanted clipping. On the other hand, no clear model exists for statistical characteristics as to the amplitude of the actual AM video signal. However, SNR of the AM video signal at modulation becomes small for 6 to 7 dB with respect to CNR, according to "Introduction to Cable Television, basic to application" supervised by Takehiro Izumi, Corona Publishing Co., Ltd., p. 198. Therefore, 0.45 to 0.5 is obtained as PFA at modulation by the actual analog video.

Figure 4:
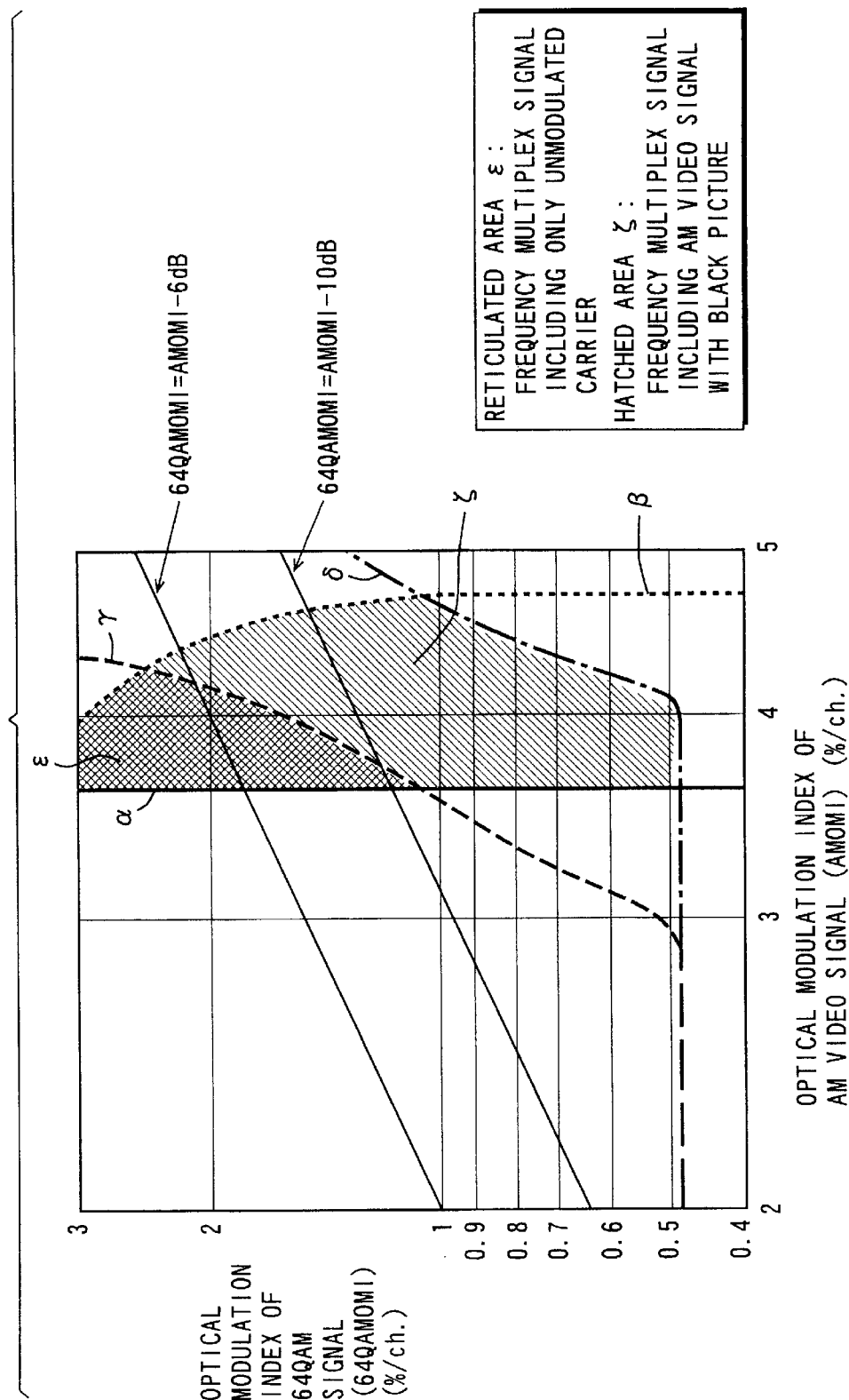
FIG. 4 is a diagram showing an example of a setting range of optical modulation indexes of each AM video signal and each 64QAM signal when the present invention is applied thereto.

The optical modulation indexes of each AM video signal and each 64QAM signal have to satisfy the above described first to third conditions as to the restrictions. From these restrictive conditions, an area shown in FIG. 4 can be obtained as an example of a setting range of the optical modulation indexes of each AM video signal and each 64QAM signal with black picture in the optical transmission system shown in FIG. 1. FIG. 4 also shows a case assuming that the frequency multiplex signal includes only an unmodulated carrier, for comparison with the above setting range of the optical modulation indexes. In FIG. 4, a solid line a shows a lower limit of CNR of the AM video signal represented by the above equation (1). A dotted line β is an upper limit of distortion represented by the above equation (2). A broken line γ is a limit by the error rate when an unmodulated carrier is assumed.

The area surrounded by these three lines α, β and γ, that is, a reticulated area ε, represents the setting range of the optical modulation indexes of the AM video signal and 64QAM signal when an unmodulated carrier is assumed. As known referring to the reticulated area ε, the maximum optical modulation index of the AM video signal, which can achieve the required error rate of the 64QAM signal, is approximately 4.3% (that is, in the vicinity of a point of intersection of the dotted line β and the broken line γ in the reticulated area ε). When the optical modulation index of the AM video signal is 4.3%, the optical modulation index of the 64QAM signal is required to be not less than 2%. Therefore, when an unmodulated carrier is assumed, the 64QAM signal requires a relatively large optical modulation index and the optical modulation index of the AM video signal is restricted to be relatively small.

Furthermore, a dotted-and-dashed line δ shows a limit by the error rate of the 64QAM signal when the AM video signal with black picture is assumed. The setting range of the optical modulation indexes of the AM video signal with black picture and the 64QAM signal is an area surrounded by three lines α, β and δ, that is, a hatched area ζ. Restrictions by the error rate of the 64QAM signal are greatly eased in the setting range represented by the hatched area ζ, compared with the setting range represented by the reticulated area ε. According to the setting range represented by the hatched area ζ, the maximum optical modulation index of the AM video signal is approximately 4.7%. When the optical modulation index of the AM video signal is approximately 4.7%, the optical modulation index of the 64QAM signal is approximately 1%. Even though the optical modulation index of the 64QAM signal has to be practically set to more than approximately 1% in order to ensure CNR of the 64QAM signal, the optical modulation index of the AM video signal can be set to approximately 4.5%. Therefore, assuming the AM video signal with black picture greatly widens the setting range of the optical modulation index of the AM video signal.

According to FIG. 4, the optical modulation index of 70% with respect to the optical modulation index given by the amplitude value of the carrier is assigned to the optical modulation index of the AM video signal, and the optical modulation index of the AM video signal can thus be set to not less than 4.5%. Therefore, use of the setting range of the optical modulation indexes of the present invention allows assignment of an optical modulation index larger than that in the optical modulation index according to the conventional analysis to the AM video signal. In AM video signal transmission, a larger optical modulation index is required to be assigned in order to ensure a transmission margin, and the setting range of the optical modulation index according to the present invention can achieve this requirement. The range of the optical modulation index shown in FIG. 4 is only an example, and a different range may be set according to components to be used and system conditions.

Figure 5:
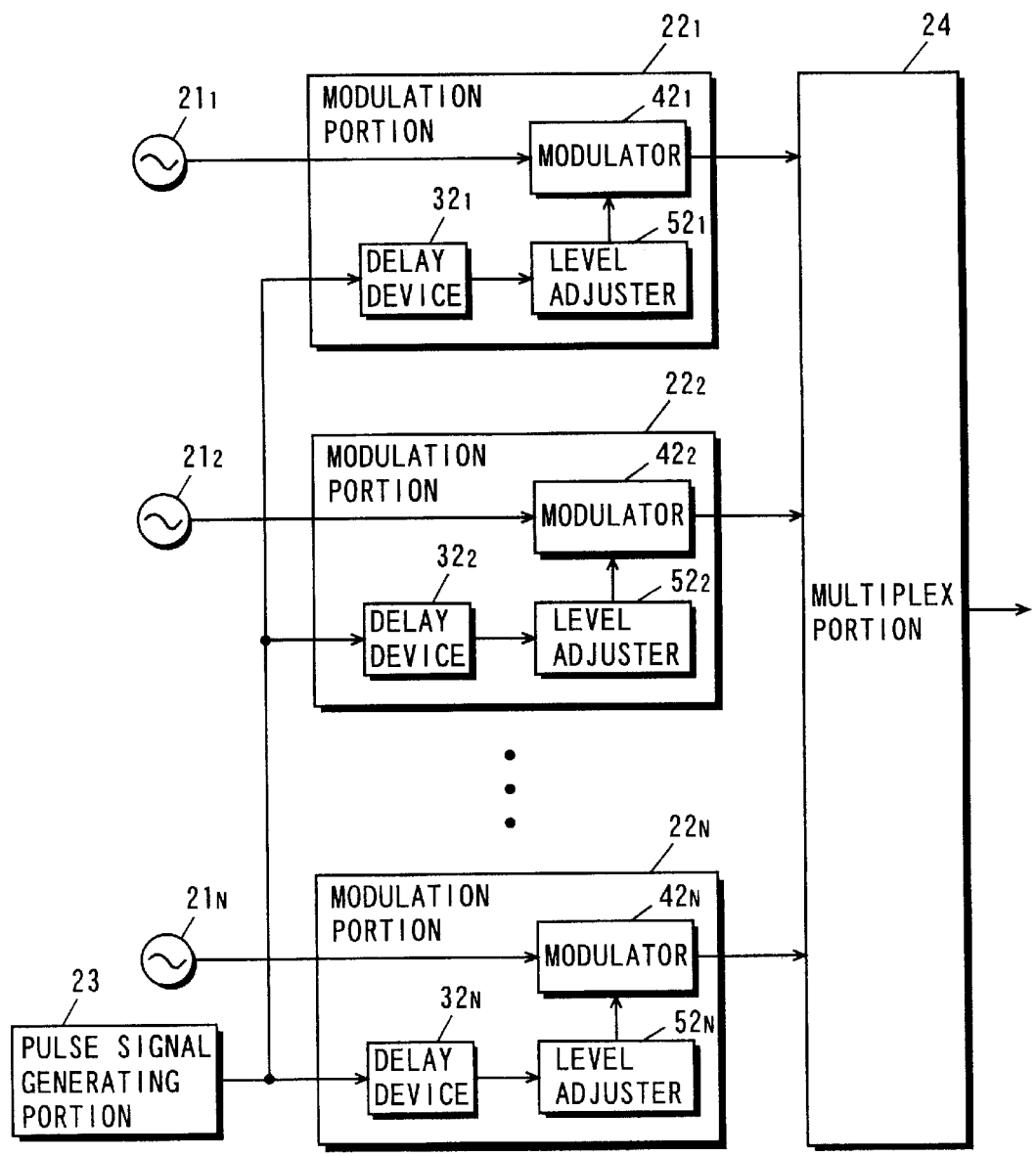
FIG. 5 is a block diagram showing an example of the structure of a signal generating apparatus for use in an error rate evaluation method according to an embodiment of the present invention.

Described next is the error rate evaluation method applied to the system to which the optical transmission method according to the embodiment of the present invention is applied, together with a signal generating apparatus for generating a test signal used for the error rate evaluation method. FIG. 5 is a block diagram showing an example of the structure of a signal generating apparatus used for the error rate evaluation method according to the embodiment of the present invention. In FIG. 5, the signal generating apparatus includes a plurality of signal sources $21_1$ to $21_N$, a plurality of modulation portions $22_1$ to $22_N$, a pulse signal generating portion 23, and a multiplex portion 24. Further, the plurality of modulation portions $22_1$ to $22_N$ each include delay devices $32_1$ to $32_N$, modulators $42_1$ to $42_N$, and level adjusting portions $52_{11}$ to $52_N$. N is an integer not less than 2.

Figure 6:
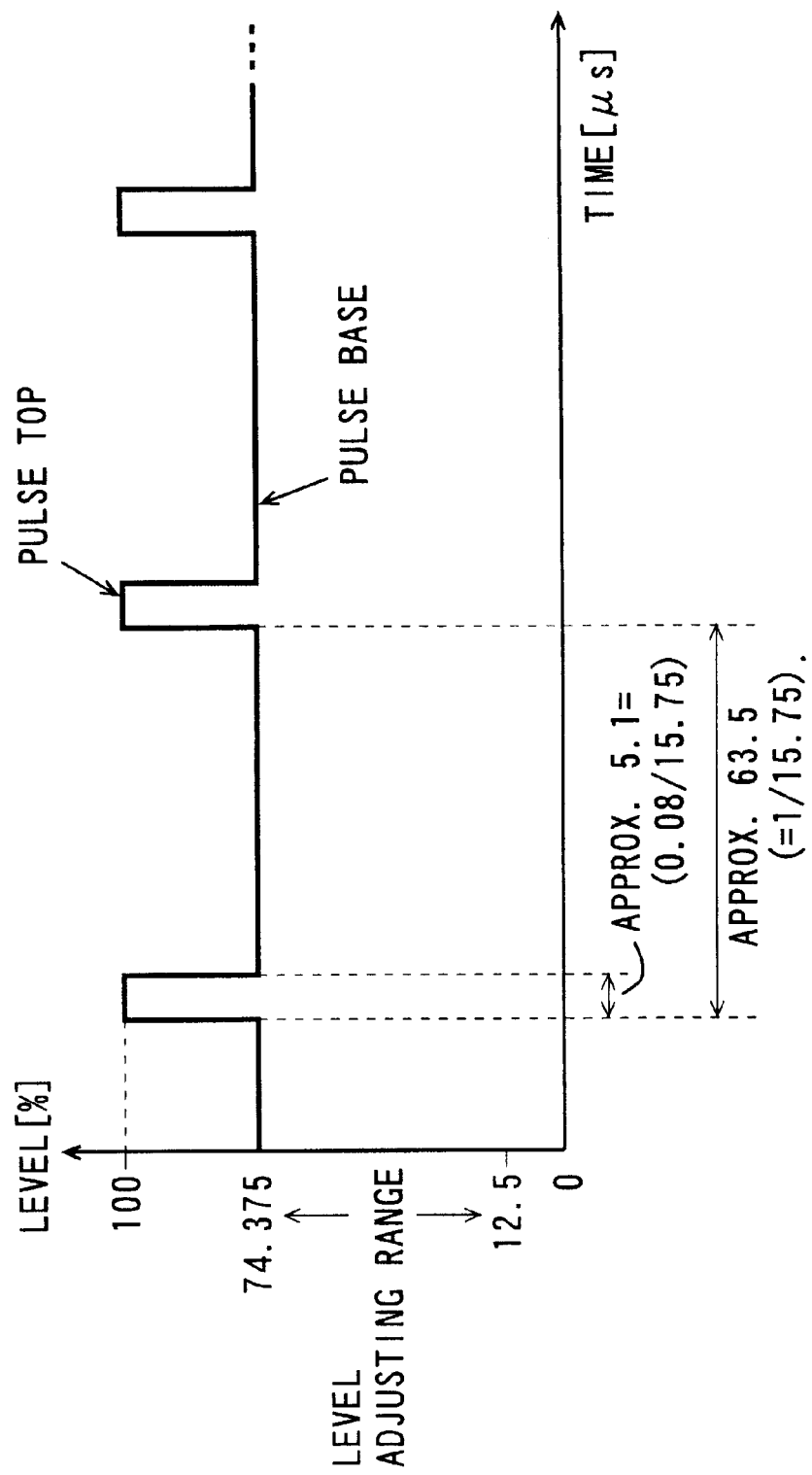
FIG. 6 is a diagram showing an envelope characteristic of a pulse-modulated signal.

The plurality of signal sources $21_1$ to $21_N$ are so-called oscillators, each generating an independent carrier with a different. As shown in FIG. 6, the pulse signal generating portion 23 generates a pulse signal whose pulse period is 15.75 kHz, which is a horizontal synchronizing period of a color television signal in the present NTSC system, and whose time width is equal to a pulse width of its horizontal synchronizing signal, 0.08*(horizontal synchronizing signal) μsec.

The plurality of delay devices $32_1$ to $32_N$, to which the above pulse signal is inputted, each randomly delay timing of the pulse signal for an independently predetermined delay amount. The pulse signal is randomly delayed because, for error rate evaluation of the QAM signal, there is no difference between multiplexing of carriers subjected to modulation with the pulse signal and multiplexing of only carriers without pulse modulation, when the maximum amplitude of each carrier occurs at the same point in time. In random delay performed in the plurality of delay devices $32_1$ to $32_N$, timing of each pulse signal after delay does not have to be different, and random delay in which a plurality of pulse signals with the same timing exist may be possible on condition that there is no specific correlation among the pulse signals after delay.

Inputted to the plurality of level adjuster $52_1$ to $52_N$ are the pulse signals after random delay outputted from the corresponding delay devices $32_1$ to $32_N$ (hereinafter referred to as delayed pulse signals), respectively. While fixing a maximum (pulse top) level of the inputted delayed pulse signal, the plurality of level adjuster $52_1$ to $52_N$ then adjust a flat portion (pulse base) level to a value described later to generate a modulating signal(hereinafter referred to as adjusted pulse signal) (refer to FIG. 6). The plurality of level adjuster $52_1$ to $52_N$ may adjust the pulse base level by selecting a predetermined level by a switch, arbitrarily setting the level by a volume knob, or the like. The above level adjusters $52_1$ to $52_N$ may be structured in the pulse signal generating portion 23. In this case, the settable pulse base level is the same with respect to each carrier, while only one level adjusting portion is enough for the structure.

The plurality of modulators $42_1$ to $42_N$, to which the corresponding carrier and adjusted pulse signal are inputted, each output a signal obtained by modulating the carrier with the adjusted pulse signal (hereinafter referred to as modulation signal). The multiplex portion 24 multiplexes all modulation signals outputted from the plurality of modulators $42_1$ to $42_N$ and outputs a multiplex signal as a test signal.

Described next is a pulse base level to be adjusted in the plurality of level adjusters $52_1$ to $52_N$ referring again to FIG. 3. The pulse base level to be adjusted in the plurality of level adjusters $52_1$ to $52_N$ is basically set by a modulation characteristic of the present NTSC color television system signal (hereinafter abbreviated as color television signal). As described above, modulation of the color television signal is negative modulation, as well known. As shown in FIG. 3, the signal amplitude subjected to modulation with video information is lower than a carrier level at a peak of the horizontal synchronizing signal (hereinafter abbreviated as synchronization peak level) and black picture gives the largest amplitude and white picture gives the smallest at the amplitude average level.

The standards of the NTSC system define that a black level of black picture which gives the largest amplitude exists between 66.25% to 74.375% with respect to the synchronization peak level, and that its amplitude average level is 70.32%. The standards also define that a white level of white picture, which gives the smallest amplitude, is 12.5% with respect to the synchronization peak level. These standardized levels are absolutes and the amplitude average level of the actual AM video signal never deviates from the standardized levels.

Therefore, when the plurality of level adjusters $52_1$ to $52_N$ arbitrarily adjust the pulse base level of the pulse signal based on the error rate to be evaluated, it is possible to evaluate the error rate of the QAM signal by a signal under conditions more accurately approximate to the conditions of multiplexing the actual AM video signals.

For example, in QAM signal error rate evaluation, when the strictest condition, "all AM video signals represent black picture", is assumed, the plurality of level adjusters $52_1$ to $52_N$ adjust the pulse signal so that the pulse base becomes a level between 66.25% to 74.375% with respect to the pulse top (preferably, 70.32%, which is the average level of the black level amplitudes). "AM video signals with not only black but also each color picture equally distributed" is assumed, the plurality of level adjusters $52_1$ to $52_N$ adjust the pulse signal so that the pulse base becomes a level of approximately 58% with respect to the pulse top (the amplitude average level when the amplitudes of the AM video signals are equally distributed is approximately 58% with respect to the synchronization peak level, according to the standards of the NTSC system).

Figure 7:
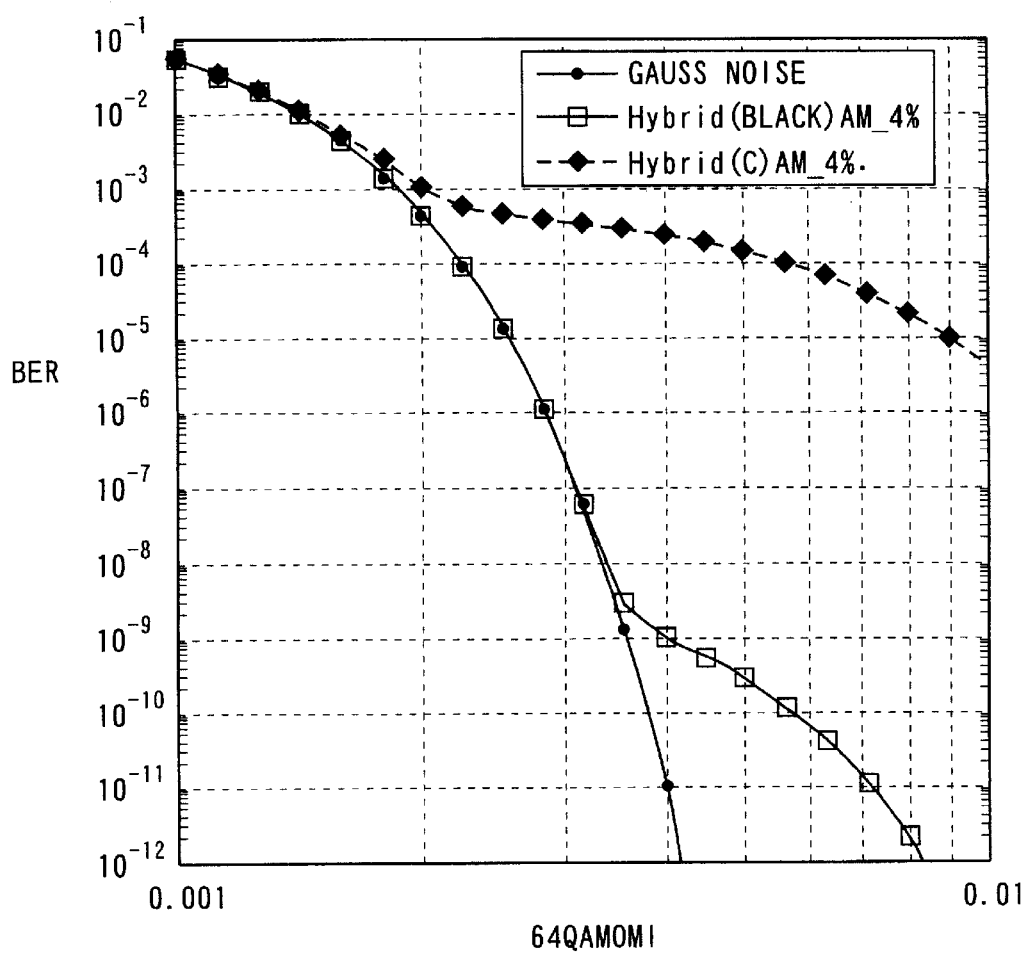
FIG. 7 is a diagram showing an example of theoretical values of 64QAM signal error rate characteristics with respect to a multiplex signal of signals with amplitude characteristics when black picture is assumed and with respect to a carrier in a CATV optical transmission apparatus.
Figure 8:
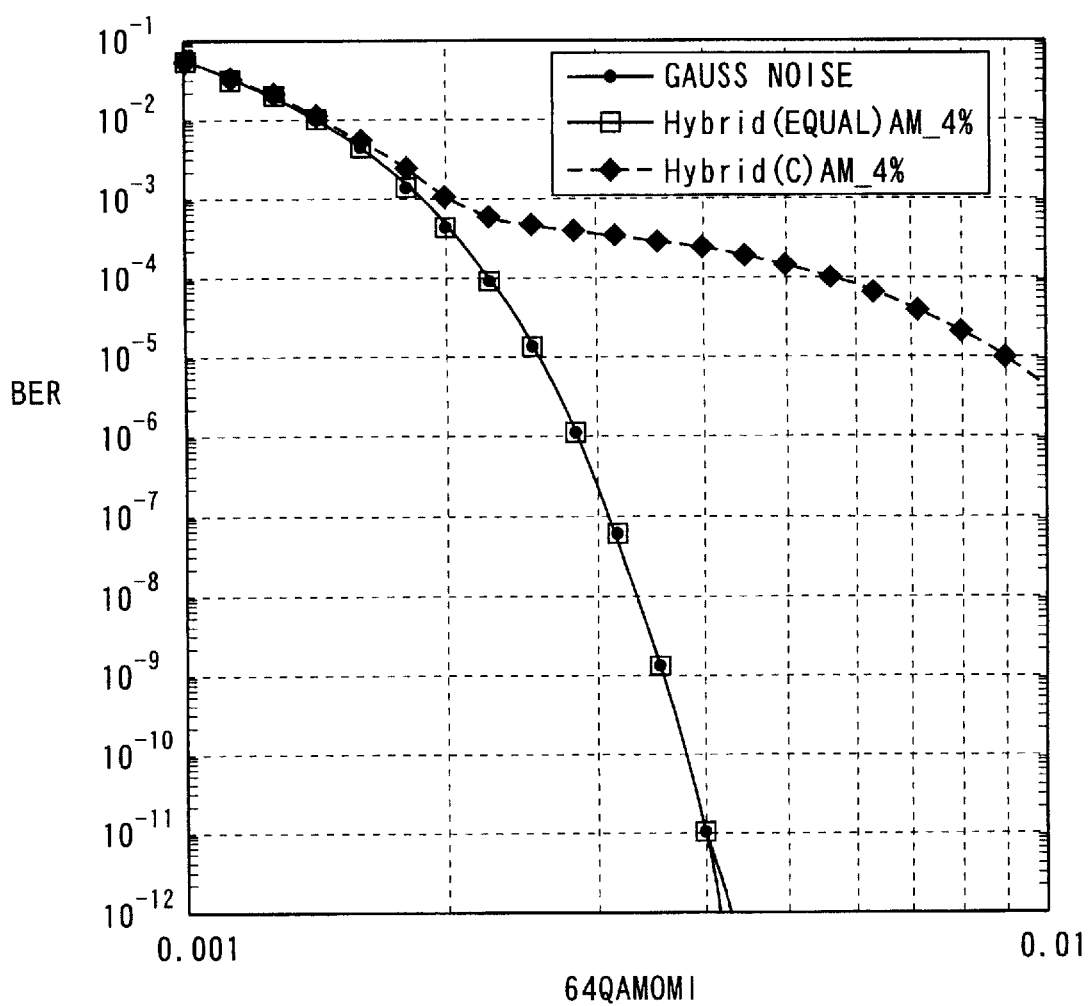
FIG. 8 is a diagram showing an example of theoretical values of 64QAM signal error rate characteristics with respect to a multiplex signal of signals when it is assumed that amplitude values of video signals are equally distributed and with respect to a carrier in the CATV optical transmission apparatus.
Figure 9:
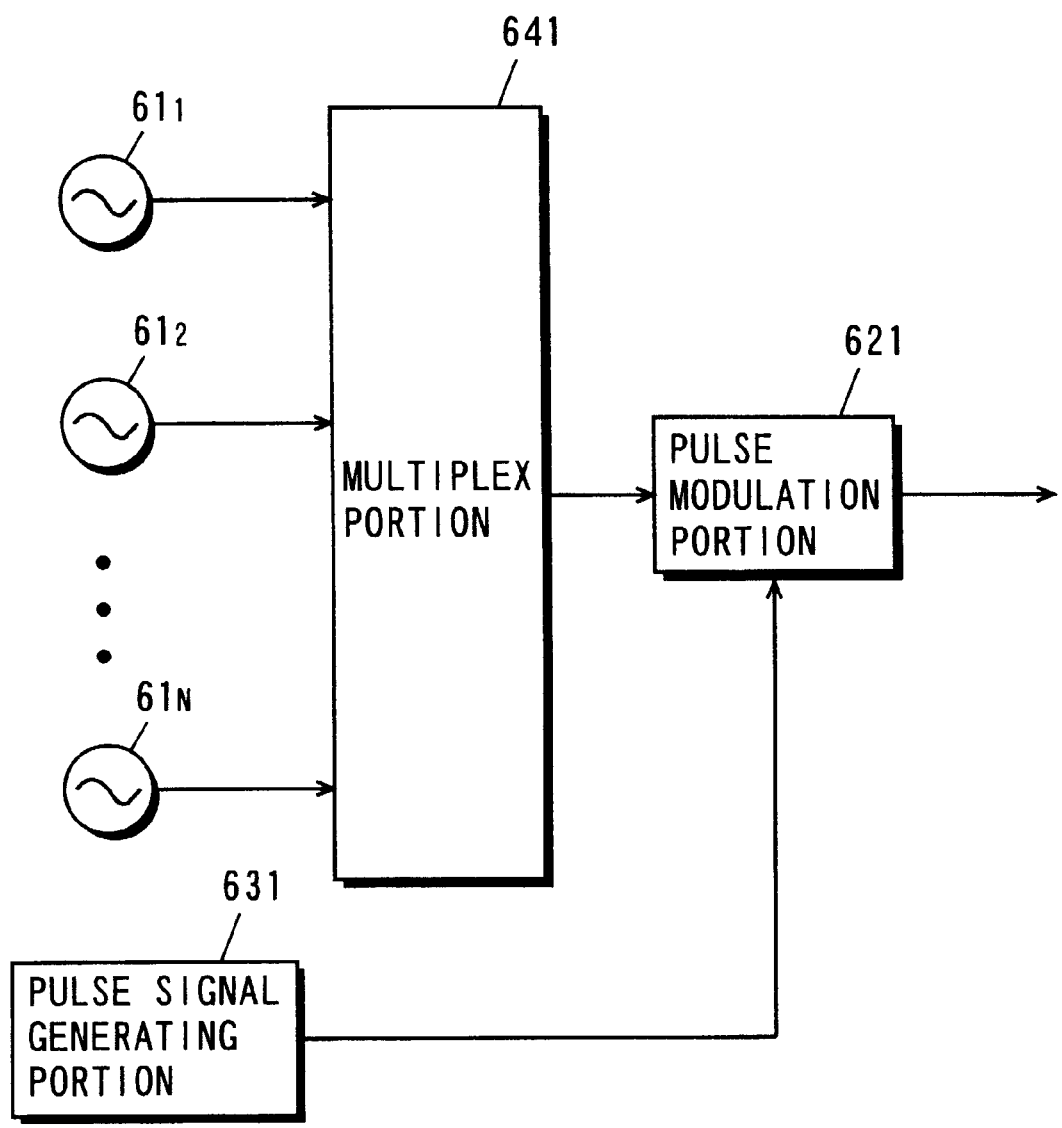
FIG. 9 is a block diagram showing an example of the structure of a conventional multiplex signal generator.
Figure 10:
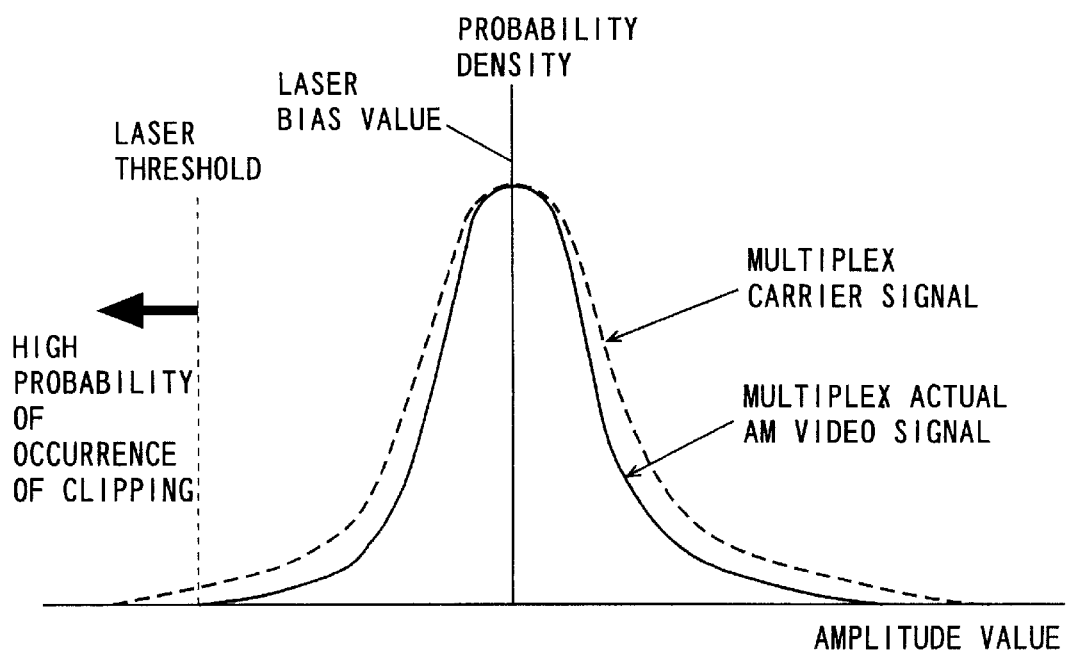
FIG. 10 is a diagram showing amplitude distribution characteristics of a test signal outputted from the conventional multiplex signal generator and an actual AM video multiplex signal.

For reference purposes, FIG. 7 shows an example of theoretical values of error rates of a 64QAM signal (obtained by providing 16 value for an in-phase signal and a quadrature signal) with respect to a test signal when assuming black picture which provides a maximum amplitude in a color television signal in an optical transmission apparatus for a CATV system. FIG. 8 shows an example of theoretical values of error rates of 64QAM signal with respect to an unmodulated carrier in the optical transmission system for the CATV system.

FIG. 7 is a diagram showing error rates of a 64QAM signal when it is assumed that a signal with 60 waves corresponding to an AM video signal and a QAM signal with one wave in a QAM transmission band are multiplexed. The optical modulation index is defined at a carrier level. In FIG. 7, black dots (● marks) represent error rate characteristics with respect to a Gauss signal, hollow squares (□ marks) represent error rate characteristics with respect to a multiplex signal of a modulated AM video signal with black picture, and black rhombuses (♦ marks) represent error rate characteristics with respect to a multiplex signal of unmodulated carriers. The conditions assumed in FIG. 7 are those in which the AM video signal shows the largest amplitude, the strictest conditions for QAM signal transmission. Therefore, as shown in FIG. 7, for the multiplex signal of the modulated AM video signals with black picture assumed, the error rate of 64QAM signal is low with respect to the carrier.

FIG. 8 is a diagram showing error rates of a 64QAM signal when it is assumed a signal with 60 waves corresponding to an AM video signal and a QAM signal with one wave in a QAM transmission band are multiplexed. The optical modulation index is defined at a carrier level. In FIG. 8, black dots (● marks) represent error rate characteristics with respect to a Gauss signal, hollow squares (□ marks) represent error rate characteristics with respect to a multiplex signal of modulated AM video signals in which the amplitude of the video signals are equally distributed, and black rhombuses (♦ marks) represent error rate characteristics with respect to a multiplex signal of unmodulated carriers. As shown in FIG. 8, the error rate characteristics of the 64QAM signal when the amplitudes are equally distributed are lower than those in FIG. 7. In the actual AM video signal, the error rate of the 64QAM signal is thought to show roughly the same characteristics as these.

Therefore, it is possible to obtain evaluation results more approximate to the error rates (● marks) of the QAM signal in the actual AM video signal when the error rates of the QAM signal are measured using the signal generating apparatus according to the present embodiment (□ marks), compared with when using the conventional signal generating apparatus (♦ marks).

As described above, according to the error rate evaluation method according to the embodiment of the present invention, timing is randomly delayed, carriers are modulated with a pulse signal with its level adjusted to a pulse base level which likely exists in an actual AM video signal, and the error rate of a QAM signal is evaluated with a test signal obtained by multiplexing the modulated signals. Therefore, it is possible to evaluate the error rate of the QAM signal in a signal state approximate at the maximum to a state of the actual AM video signal (that is, analogous distribution characteristics of the multiplex signal amplitude). In the error rate evaluation method of the present invention, it is thus possible to accurately evaluate the error rate of the QAM signal under the strictest conditions, which may occur in the actual, AM video signal, thereby ensuring the reliability of the entire CATV system.

Described above is the error characteristic evaluation method of a QAM signal using a test signal obtained by multiplexing a plurality of carriers each subjected to desired pulse modulation in the above embodiment. However, it is also possible to evaluate error characteristics of a QAM signal in the above described signal state approximate at the maximum to a state of the actual AM video signal using a test signal obtained by multiplexing only unmodulated carriers without pulse modulation, although evaluation accuracy is somewhat poorer than that in the method described in the above embodiment.

Described below is the error characteristic evaluation method using a test signal obtained by multiplexing only unmodulated carriers without pulse modulation.

As described above, when the error rate is evaluated in the apparatus for multiplexing AM video signals and optically-transmitting the resultant signal, the amplitude level of the AM video signal is defined at a horizontal synchronizing signal level. The AM video signal level is defined as the horizontal synchronizing signal level because the amplitude value modulated with the video signal varies according to the transmitted video signal level and is not uniquely determined, while the synchronization peak level is always constant in any video signal transmission. Further, the synchronization peak level provides a maximum value of the AM video signal, that is, an unmodulated carrier level.

However, the pulse width of the horizontal synchronizing signal is approximately 8% of the horizontal synchronizing period, which is short in time, and thus has little effect on the average amplitude level of all of the AM video signals. Further, if the horizontal synchronizing pulse is random, QAM signal error rate deterioration due to clipping when the AM video signal and the QAM signal are multiplexed and optically transmitted is determined roughly by the average amplitude level of the AM video signals.

Therefore, without considering the horizontal synchronizing signal, by lowering (adjusting) the carrier level to an arbitrary level within a range which the video signal can take with respect to the peak level of the horizontal synchronizing signal, it is possible to make test conditions approximately equal to those of the multiplex signal of the carriers with the above pulse modulation.

Specifically, each carrier level is attenuated by approximately 3 dB (adjusted to approximately 70% in amplitude) with respect to the level of the AM video signal to be measured, and it is thus possible to obtain amplitude conditions (that is, multiplex signal amplitude distribution) approximately equal to those of the multiplex signal of the AM video signals with black picture. Further, each carrier level is attenuated by approximately 5 dB (adjusted to approximately 58% in amplitude) with respect to the level of the AM video signal to be measured, and it is thus possible to obtain amplitude conditions approximately equal to those when the AM video signal amplitude are equally distributed. The above described level attenuation of each carrier is performed by an attenuator and the like provided in the following step of the multiplex portion 24, for example.

Use of the above described method does not require the pulse modulation function described above (the pulse signal generator 23 and the modulators $21_1$ to $21_N$), allowing more simple error rate evaluation of the QAM signal under conditions approximate to those the actual AM video signal transmission.

While the invention has been described in detail, the foregoing description is in all aspects illustrative and not restrictive. It is understood that numerous other modifications and variations can be devised without departing from the scope of the invention.

What is claimed is:

1. An error rate evaluation method for evaluating an error rate of a QAM signal when an AM video signal and the QAM video signal are multiplexed and optically transmitted, comprising the steps of:
   generating a test signal;
   optically transmitting said test signal through a transmission path; and
   receiving said test signal optically transmitted through said transmission path and evaluating the error rate of the QAM signal;
   in order to generate said test signal, the method generating:
      a plurality of carriers with different frequencies; and
      a plurality of pulse signals with the same period and time width as those of a horizontal synchronizing signal in NTSC color television system standards, each being delayed for a randomly predetermined delay amount, with a level of a pulse base with respect to a pulse top adjusted to a predetermined level within a level range which a video signal amplitude can take with respect to a peak level of the horizontal synchronizing signal in the standards; and
   the method using, as said test signal, a multiplex signal obtained by multiplexing a plurality of modulated signals obtained by modulating amplitudes of a plurality of carriers which can be substituted for said AM video signal among said plurality of carriers with said plurality of pulse signals.

2. The error rate evaluation method according to claim 1, wherein
   each of said plurality of pulse signals is adjusted so that said pulse base becomes at an average level of black level amplitudes with respect to said pulse top when said AM video signal represents black picture.

3. The error rate evaluation method according to claim 1, wherein
   each of said plurality of pulse signals is adjusted so that said pulse base becomes at an amplitude average level with respect to said pulse top when amplitudes of said AM video signal are equally distributed.

4. An error rate evaluation method for evaluating an error rate of a QAM signal when an AM video signal and the QAM video signal are multiplexed and optically transmitted, comprising the steps of:
   generating a test signal;
   optically transmitting said test signal through a transmission path; and
   receiving said test signal optically transmitted through said transmission path and evaluating the error rate of the QAM signal;
   in order to generate said test signal, the method generating:
      a plurality of carriers with different frequencies; and
   the method using, as said test signal, a signal obtained by adjusting amplitudes of a plurality of carriers which can be substituted for said AM video signal among said plurality of carriers to a predetermined level within a level range which a video signal amplitude can take with respect to a peak level of a horizontal synchronizing signal in NTSC color television system standards.

5. The error rate evaluation method according to claim 4, wherein
   each of said amplitudes of the carriers is adjusted to an average level of black level amplitudes with respect to said peak level when said AM video signal represents black picture.

6. The error rate evaluation method according to claim 4, wherein
   each of said amplitudes of the carriers is adjusted to an amplitude average level with respect to said peak level when amplitudes of said AM video signal are equally distributed.

7. A signal generating apparatus for generating a test signal used for evaluating an error rate of a QAM signal when an AM video signal and the QAM signal are multiplexed and optically transmitted, comprising:
   a plurality of carrier generating means for generating carriers with different frequencies;
   pulse signal generating means for generating a pulse signal with a period and time width equal to those of a horizontal synchronizing signal in NTSC color television system standards;
   a plurality of delay means for delaying the pulse signal outputted from said pulse signal generating means for a randomly predetermined delay amount;

a plurality of level adjusting means for adjusting a level of a pulse base with respect to a pulse top of a delayed pulse signal outputted from said delay means to a predetermined level within a level range which a video signal amplitude can take with respect to a peak level of said horizontal synchronizing signal in said standards;

a plurality of modulation means for modulating a plurality of carriers which can be substituted for said AM video signal among the carriers generated by said carrier generating means with an adjusted pulse signal outputted from said level adjusting means; and multiplex means for multiplexing a plurality of modulated signals outputted from said plurality of modulation means or for multiplexing a plurality of pulse modulating signals outputted from said plurality of modulation means and carriers other than the plurality of carriers which can be substituted for said AM video signal, and then outputting a resultant signal as said test signal.

8. The signal generating apparatus according to claim 7, wherein
said plurality of level adjusting means can at least selectively switch said pulse base with respect to said pulse top between a pulse base adjusted to an average level of black level amplitudes when said AM video signal represents black picture and a pulse base adjusted to an amplitude average level when amplitudes of said AM video signal are equally distributed.

9. A method for simultaneously optically-transmitting analog video information and digital video information, comprising the steps of:

amplitude-modulating carriers with different frequencies with the analog video information and generating an AM video signal by a plurality of AM video signal sources;

64-value-quadrature-amplitude-modulating the carriers with the digital video information and generating a 64QAM signal by one or more 64QAM signal sources;

frequency multiplexing the AM video signal generated by each of said AM video signal sources and the 64QAM signal generated by each of said 64QAM signal sources by frequency multiplex means; and subjecting said AM video signal and said 64QAM signal frequency-multiplexed by said frequency multiplex means to electrical-optical conversion to obtain and output an optical intensity modulation signal to an optical transmission path; wherein said outputted optical modulating signal is generated so as to satisfy:

a first condition that an optical modulation index which makes said AM video signal not less than a required CNR is assigned to the carriers of the analog video signal;

a second condition that an optical modulation index which makes distortion in a transmission band of said AM video signal not more than a required value is assigned to a carrier of the AM video signal and said 64 QAM signal; and a third condition that an optical modulation index of said analog video signal is approximately 70% of the optical modulation index of the carrier included in said AM video signal, and that an optical modulation index by which each of said 64 QAM signal achieves required quality is assigned to a carrier of the 64QAM signal.

* * * * *